United States Patent
Wakatsuki

(10) Patent No.: US 7,002,953 B2
(45) Date of Patent: Feb. 21, 2006

(54) MULTIMEDIA DATA TRANSFER SYSTEM BETWEEN COMPUTERS ASSOCIATED WITH TERMINALS

(75) Inventor: Shinobu Wakatsuki, Tokyo (JP)

(73) Assignee: NEC Corporation, Tokyo (JP)

(*) Notice: Subject to any disclaimer, the term of this patent is extended or adjusted under 35 U.S.C. 154(b) by 14 days.

(21) Appl. No.: 10/869,925

(22) Filed: Jun. 18, 2004

(65) Prior Publication Data
US 2004/0258052 A1   Dec. 23, 2004

(30) Foreign Application Priority Data
Jun. 18, 2003   (JP) .............................. 2003-172712

(51) Int. Cl.
*H04L 12/26* (2006.01)
(52) U.S. Cl. ...................................... 370/352; 370/401
(58) Field of Classification Search ................ 370/253, 370/252, 271, 272, 389, 392, 351, 352, 356, 370/259, 265, 231, 232, 400, 401; 709/224, 709/227
See application file for complete search history.

(56) References Cited

U.S. PATENT DOCUMENTS

| | | | | |
|---|---|---|---|---|
| 5,930,493 A | * | 7/1999 | Ottesen et al. ................ | 725/92 |
| 6,577,605 B1 | * | 6/2003 | Dagate et al. ............... | 370/270 |
| 6,629,124 B1 | * | 9/2003 | Iwasaki et al. ............. | 709/200 |

FOREIGN PATENT DOCUMENTS

| | | |
|---|---|---|
| JP | 2000-115354 | 4/2000 |
| JP | 2002-199026 | 7/2002 |
| JP | 2003-46665 | 2/2003 |

\* cited by examiner

*Primary Examiner*—Hassan Kizou
*Assistant Examiner*—Ricardo Pizarro
(74) *Attorney, Agent, or Firm*—Young & Thompson

(57) ABSTRACT

A system allows prompt multimedia data transfer during communication between personal telephones through a dedicated line connecting PBXs. A database connected to each PBX stores association information between a personal telephone and a personal computer. When a multimedia application installed in one personal computer associated to one personal telephone starts up, another multimedia application installed in the other personal computer associated to the other personal telephone automatically starts up allowing multimedia data communicate with each other.

10 Claims, 10 Drawing Sheets

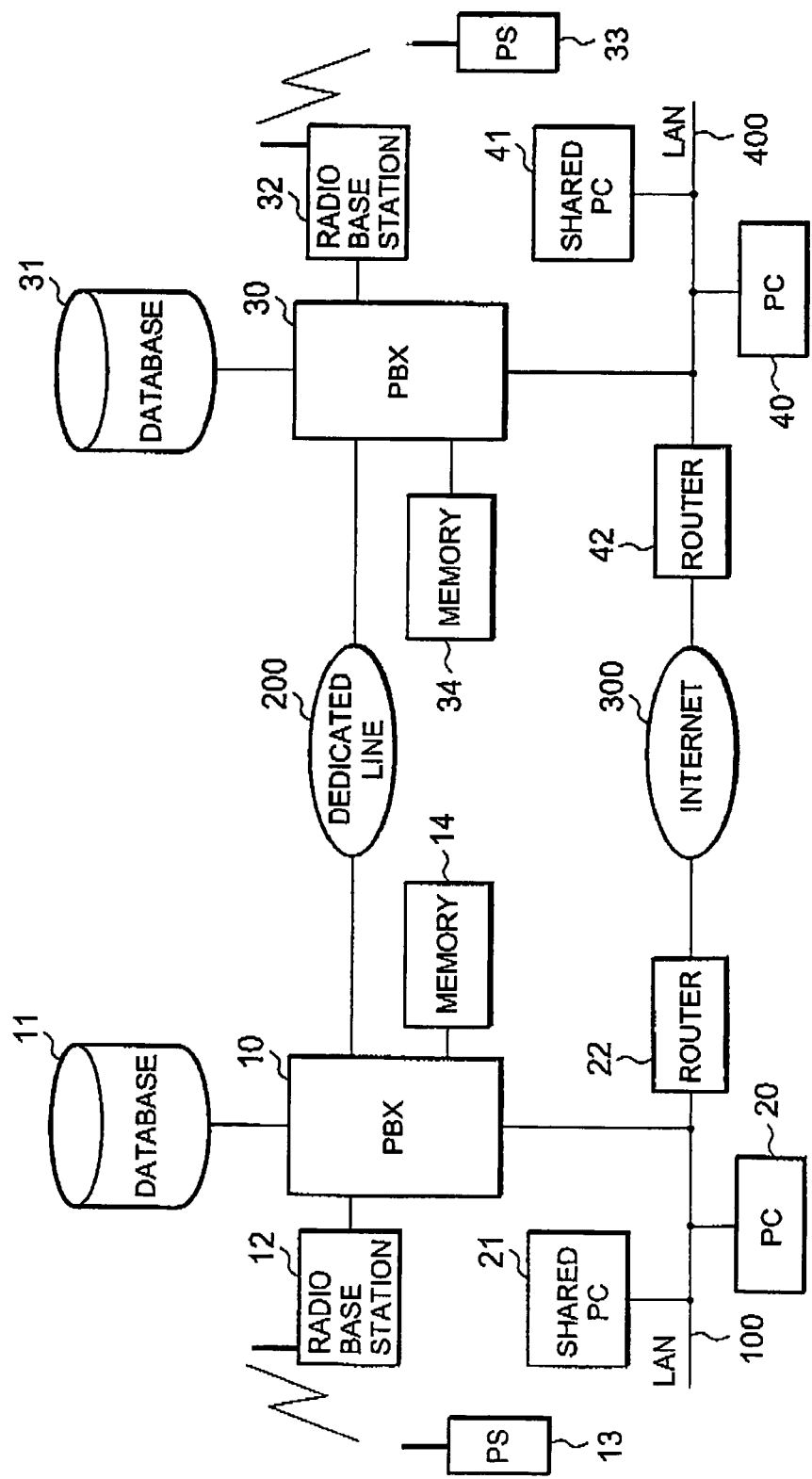

|   | TERMINAL NUMBER | IP ADDRESS OF ASSOCIATED PC | OTHER-END TERMINAL NUMBER | APPLICATION STATUS |
|---|---|---|---|---|
| 1 | 3000 | 172.16.253.5 | 867000 | READY/IN-USE/UNUSED |
| 2 | 3001 | UNREGISTERED | UNREGISTERED | UNREGISTERED |
| ⋮ | ⋮ | ⋮ | ⋮ | ⋮ |

|   | ID NUMBER OF OTHER-END PBX | IP ADDRESS OF OTHER-END PBX |
|---|---|---|
| 1 | 83 | 10 41.89.100 |
| 2 | 86 | 172.16.253.10 |
| ⋮ | ⋮ | ⋮ |

|   | TERMINAL NUMBER | IP ADDRESS OF ASSOCIATED PC | OTHER END TERMINAL NUMBER | APPLICATION STATUS |
|---|---|---|---|---|
| 1 | 7000 | 10.41.89.35 | 833000 | READY/IN-USE/UNUSED |
| 2 | 7001 | UNREGISTERED | UNREGISTERED | UNREGISTERED |
| . | . | . | . | . |

|   | ID NUMBER OF OTHER-END PBX | IP ADDRESS OF OTHER-END PBX |
|---|---|---|
| 1 | 83 | 10.41.89.100 |
| 2 | 86 | 172.16.253.10 |
| . | . | . |

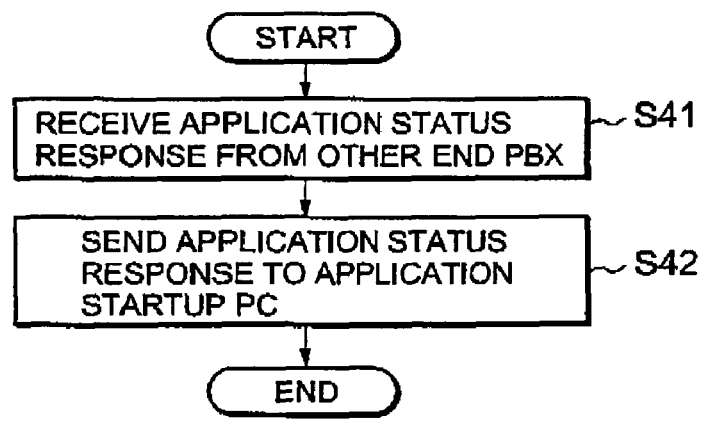
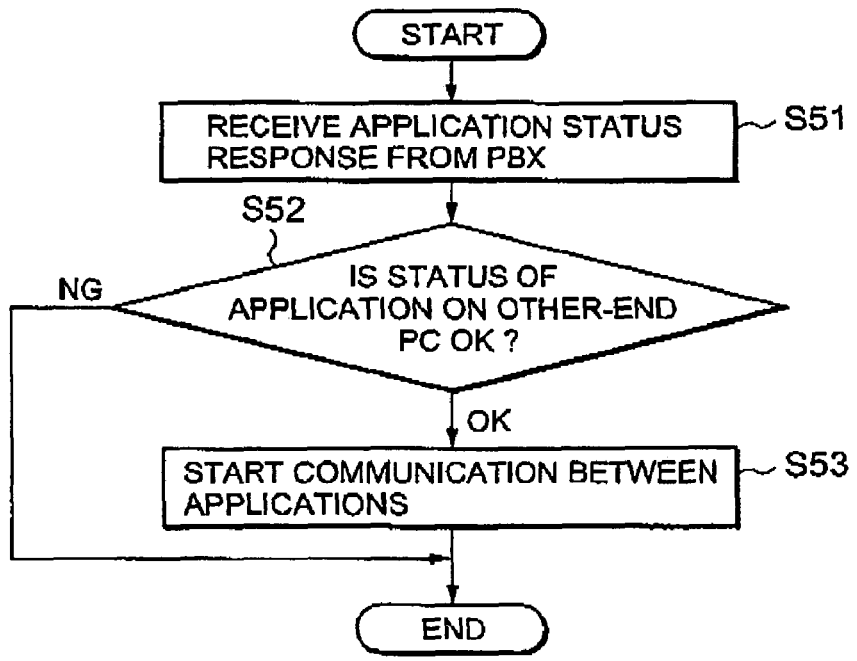

MULTIMEDIA DATA TRANSFER SYSTEM BETWEEN COMPUTERS ASSOCIATED WITH TERMINALS

BACKGROUND OF THE INVENTION

1. Field of the Invention

The present invention relates to a multimedia data transfer system and in particular to system and method for associating existing terminals with personal computers allowing multimedia data to be transferred.

2. Description of the Related Art

With the advent of IP telephony technologies, interconnection or cooperation of a telephone terminal and a personal computer has been one of important issues and various technical proposals have been made. For example, Japanese Patent Application Unexamined Publication No. 2000-115354 discloses an Internet phone handset device that is connected to the MIDI port and the sound I/O port of a sound card slotted into a personal computer.

In the case of a plurality of telephone terminals accommodated in a private branch exchange (PBX), a plurality of personal computers is connected to each other by a local-area network (LAN), which is connected to the PBX. Accordingly, a telephone terminal may be linked to a corresponding personal computer through the PBX and the LAN.

For example, Japanese Patent Application Unexamined publication No. 2002-199026 discloses a method of interconnecting IP telephone terminals and personal computers, which makes it possible to interconnect an IP telephone-terminal and a personal computer when calling by using a caller database containing caller names and identification information assigned to terminals of respective ones of the callers.

Japanese Patent Application Unexamined Publication No. 2003-46665 discloses an IP multifunction telephone system provided with a PBX having an address information management table so as to integrally manage IP multifunction telephones and linked personal computers.

However, in the above-described conventional methods and systems, when a telephone terminal is communicating with another telephone terminal on the other end of the line, it is necessary to take a complicated procedure to transfer data from a personal computer corresponding to the telephone terminal to another personal computer corresponding to the other telephone terminal. For example, it is necessary to obtain the IP address, domain name, telephone number and mail address of the other personal computer before starting up a multimedia application for transferring multimedia data such as sound, image, text and/or video data. Accordingly, timely providing or exchanging information cannot be achieved.

SUMMARY OF THE INVENTION

An object of the present invention is to provide a multimedia data transfer system and terminal association method, which can promptly transfer multimedia data with efficiency.

Another object of the present invention is to provide a multimedia data transfer system and terminal association method, which can promptly transfer multimedia data with reducing place restrictions.

According to an aspect of the present invention, multimedia data is allowed to be transferred between processes generated by software programs each running on information processing terminals, wherein the information processing terminals are capable to communicate with each other through at least one call connection controller that accommodates a plurality of extension terminals. Each call connection controller includes: a database for storing association information when an association operation has been performed between an extension terminal and an information processing terminal, which are both connected to the call connection controller; a determining section for determining the presence or absence of an information processing terminal that has completed the association operation and a status of a software program on the information processing terminal; and a controller controlling such that, during communication between a first extension terminal and a second extension terminal, when first and second information processing terminals that have completed the association operations with the first and second extension terminals have been found and both of software programs on the first and second information processing terminals are ready and currently unused multimedia data starts transferring between processes generated by the software programs running on the first and second information processing terminals, respectively.

According to another aspect of the present invention, a multimedia data transfer method includes: a) storing association information in a database when an association operation has been performed between an extension terminal and an information processing terminal; b) during communication between a first extension terminal and a second extension terminal, searching the database to determine the presence or absence of first and second information processing terminals that have completed the association operations with the first and second extension terminals and statuses of software programs on the first and second information processing terminals; and c) when the first and second information processing terminals have been found and both of the software programs are ready and currently unused, starting transfer of multimedia data between processes generated by the software programs running on the first and second information processing terminals, respectively.

The steps b) and c) may include: when starting up a first software program on a first information processing terminal during communication between a first extension terminal associated with the first information processing terminal and a second extension terminal, searching the database to determine the presence or absence of a second information processing terminal that has completed the association operation with the second extension terminals and a status of a second software program on the second information processing terminal; and when the second information processing terminal has been found and the second software program is currently unused, starting transfer of multimedia data between processes generated by the first and second software programs running on the first and second information processing terminals.

A call connection controller according to the present invention accommodates a plurality of extension terminals in a system for transferring multimedia data between processes generated by software programs each running on information processing terminals. The call connection controller includes: a database for storing association information when an association operation has been performed between an extension terminal and an information processing terminal, which are both connected to the call connection controller; a determining section for determining the presence or absence of an information processing terminal that has completed the association operation and a status of a software program on the information processing terminal; and a controller controlling such that, during communication between a first extension terminal and a second extension terminal, when first and second information processing terminals that have completed the association operations with the first and second extension terminals have been found and both of software programs on the first and second information processing terminals are ready and currently unused, multimedia data starts transferring between processes generated by the software programs running on the first and second information processing terminals, respectively.

According to still another aspect of the present invention, an extension terminal is allowed to be associated with a process generated by a software program running on an information processing terminal to transfer multimedia data between processes generated by software programs each running on information processing terminals, by the following steps: when one of a call originating operation and a call receiving operation is performed at an extension terminal, storing an other-end terminal number of an other-end extension terminal in a database; when starting up a first software program on a first information processing terminal by designating a terminal number of the extension terminal during communication with the other-end extension terminal, registering address information of the first information processing terminal and a status of the first software program for the terminal number in the database; querying about the presence or absence of a second information processing terminal associated with the other-end extension terminal and a status of a second software program on the second information processing terminal; and when receiving a response that the second information processing terminal has been found and the second software program is ready and currently unused, starting transfer of multimedia data between processes generated by the first and second software programs running on the first and second information processing terminals.

As described above, according to the present invention, during communication between extension telephones accommodated in PBXs connected through a dedicated line, multimedia applications installed in respective personal computers each associated to the extension telephones are easy to start up, resulting in improved efficiency of starting multimedia data transmission.

Conventionally, IP address, telephone number, mail address or the like are previously needed to identify the other-end terminal with which multimedia data is transferred.

In contrast, according to the present invention, during communication between extension telephones accommodated in different PBXs, prompt and automatic multimedia data transfer between personal computers associated with extension telephones now communicating with each other can be achieved without user entering IP addresses and other necessary data of the other-end computer.

BRIEF DESCRIPTION OF THE DRAWINGS

FIG. 1 is a block diagram showing a multimedia data transfer system according to an embodiment of the present invention;

FIGS. 2A and 2B are diagrams showing an example of a database connected to one PBX in the embodiment;

FIGS. 3A and 3B are diagrams showing an example of a database connected to the other PBX in the embodiment;

FIG. 10A is a flowchart showing an operation of the application startup PBX when receiving the application status response from the other-end PBX; and FIG. 10B is a flowchart showing an operation of the application startup PC when receiving the application status response.

DESCRIPTION OF THE PREFERRED EMBODIMENTS

System

Figure 4:
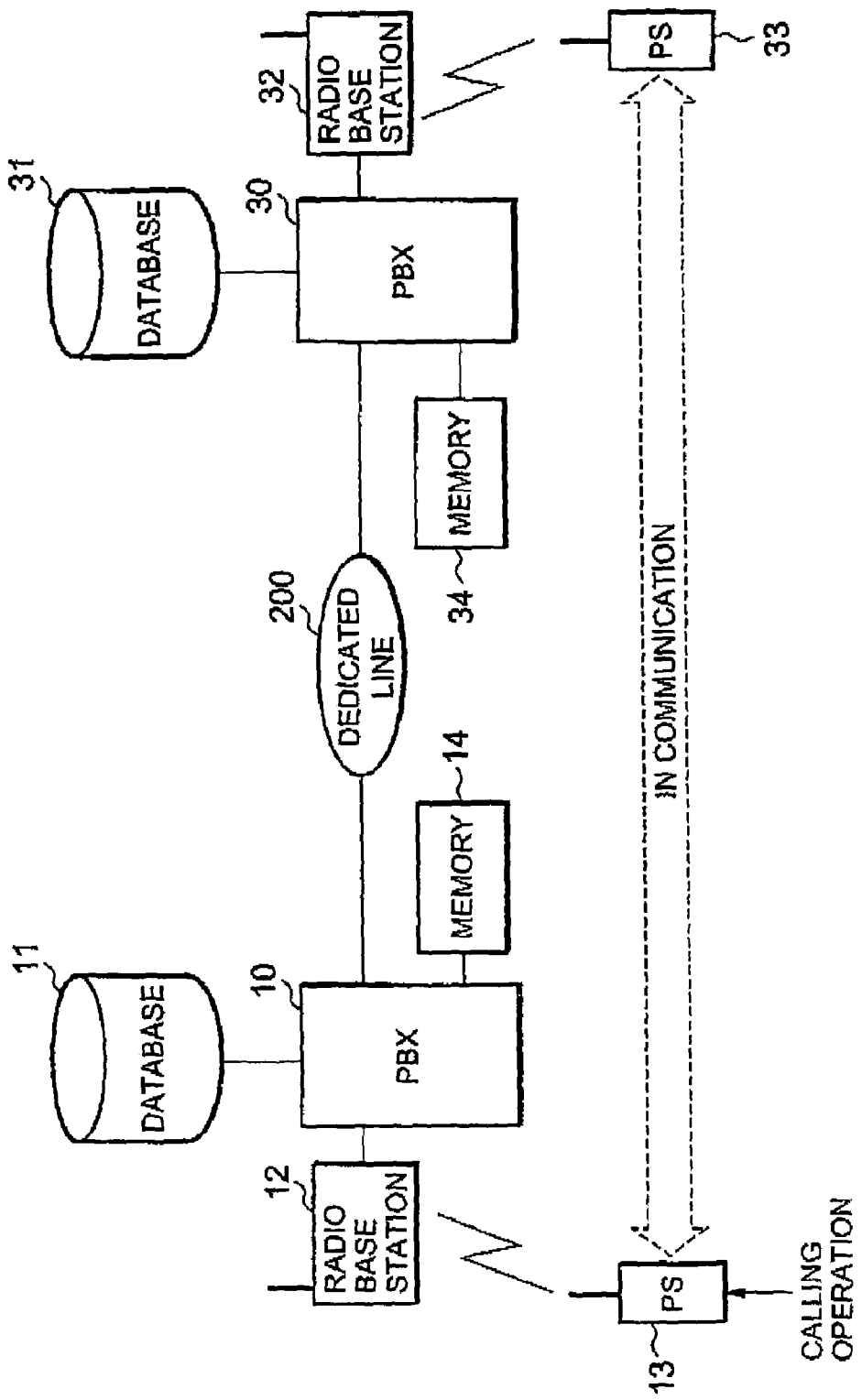
FIG. 4 is a block diagram showing a calling operation of the multimedia data transfer system.

As shown in FIG. 1, it is assumed for simplicity that a multimedia data transfer system according to an embodiment of the present invention is composed of first and second local networks, which can communicate with each other through at least one of a dedicated line 200 and the Internet 300.

In FIG. 1, the first local network includes a LAN 100 composed of a PBX 10, a plurality of personal computers 20, at least one shared personal computer 21, and a router 22. The PBX 10 connects at least one radio base station 12, which can communicate with at least one personal mobile station (PS) 13 by radio. The personal mobile station 13 is an extension telephone terminal accommodated in the PBX 10, for example, an on-premises PHS (Personal Handyphone System) telephone terminal. Hereinafter, "personal mobile station" will be replaced with "PS" as appropriate. The PBX 10 is connected to a database 11, which is used to perform a multimedia data transferring operation according to the present invention. Further, the PBX 10 is connected to a memory 14 storing control programs, which are to run on a computer (not shown) of the PBX 10 to perform the multimedia data transferring operation.

The PBX 10 allows each personal mobile station 13 to perform telephone communication through the dedicated line 200. The router 22 allows each personal computer 20 to perform data communication (here, multimedia data communication) through the Internet 300. The router 22 may allow each personal mobile station 13 to perform voice or data communication through the Internet 300. When a personal mobile station 13 makes or receives a call to or from a personal mobile station 33 through the dedicated line 200, the PBX 10 registers information related to the calling or called operation into the database 11.

The personal computers 20 are individually used by users (for example, in a certain section), and the shared personal computer 21 may be shared between the users of the section. As described later, the PBX 10 can control each personal mobile station 33, each personal computer 20, and/or the shared personal computer 21 based on registered information stored in the database 11.

Similarly, the second local network includes a LAN 400 composed of a PBX 30, a plurality of personal computers 40, at least one shared personal computer 41, and a router 42. The PBX 30 connects at least one radio base station 32, which can communicate with at least one personal mobile station 33. The PBX 30 is connected to a database 31, which is used to perform a multimedia data transferring operation according to the present invention. Further, the PBX 30 is connected to a memory 34 storing control programs, which are to run on a computer (not shown) of the PBX 30 to perform the multimedia data transferring operation.

The PBX 30 allows each personal mobile station 33 to perform telephone communication through the dedicated line 200. The router 42 allows each personal computer 40 to perform data communication (here, multimedia data communication) through the Internet 300. The router 42 may allow each personal mobile station 33 to perform voice or data communication through the Internet 300. When a personal mobile station 33 makes or receives a call to or from a personal mobile station 13 through the dedicated line 200, the PBX 30 registers information related to the calling or called operation into the database 31.

The personal mobile station 33 is an extension telephone terminal accommodated in the PBX 30, for example, an on-premises PHS telephone terminal.

The personal computers 40 are individually used by users for example, in a certain section), and the shared personal computer 41 may be shared between the users of the section. As described later, the PBX 30 can control each personal mobile station 33, each personal computer 40, and/or the shared personal computer 41 according to registered information stored in the database 31.

In this embodiment, a multimedia application is installed in the personal computers 20, 40 and the shared personal computers 21, 41. Here, the multimedia application is an application software program including the use of audio, graphics, text and full-motion video, which can run on a microprocessor of each personal computer. The multimedia application may be used for video conference, white board, real-time data exchange (so-called chat), or software-based IP phone (soft phone) installed on a personal computer.

Database

The databases 11 and 31 are each used to associate personal mobile stations 13 and 33 with the multimedia application installed on corresponding personal computers or shared personal computers. The databases 11 and 31 have the same database structure as shown in FIGS. 2A, 2B and FIGS. 3A, 3B.

As shown in FIGS. 2A and 2B, the database 11 has an association table 11a and an other-end PBX table 11b. The association table 11a is composed of the following fields: terminal number; IP address of associated PC; other-end terminal number; and application status. The other-end PBX table 11b is composed of the following fields: identification number of other-end PBX; and IP address of other-end PBX.

The terminal number is the phone number or identification number of each personal mobile station 13 (here "3000", "3001" . . . ), which are previously registered in the association table 11a. The IP address of associated PC is the IP address of a personal computer 20 or 21 associated with each personal mobile station 13. The other-end terminal number is the phone number or identification number of a personal mobile station 33 with which each personal mobile station 13 is communicating. The application status is the status (operating/unused/unregistered) of a multimedia application on the associated personal computer 20 or 21.

The identification number of other-end PBX corresponds to a so-called area code of an other-end terminal number. In this example, in the case of the other-end terminal number being "867000", it is determined that the identification number and IP address of the other-end PBX 30 are "86" and "172,16,253,10", respectively.

As shown in FIGS. 3A and 3B, the database 31 has an association table 31a and an other-end PBX table 31b. The association table 31a and the other-end PBX table 11b are composed of the same fields as the association table 11a and the other-end PBX table 11b as described above.

System Operation

As shown in FIG. 4, it is assumed that a personal mobile station 13 having its terminal number "3000" makes a call to the personal mobile station 33 having its terminal number "7000" through the dedicated line 200, wherein the dedicated line 200 connects the PBX 10 having ID number "83" to the PBX 30 having ID number "86".

A connection between the personal mobile stations 13 and 33 is established by a caller PS 13 dialing the other-end PS terminal number with PBX number (here, "867000").

When the connection has been established, the originating PBX 10 registers the other-end terminal number "867000" into the association table 11a of the database 11 as shown in FIG. 2A. At the same time, the receiving PBX 30 registers the other-end terminal number "833000" into the association table 31a of the database 31 as shown in FIG. 3A. When the communication between the PSs 13 and 33 has been terminated to disconnect the connection, the other-end terminal numbers registered are deleted from the databases 11 and 31, respectively.

Figure 5:
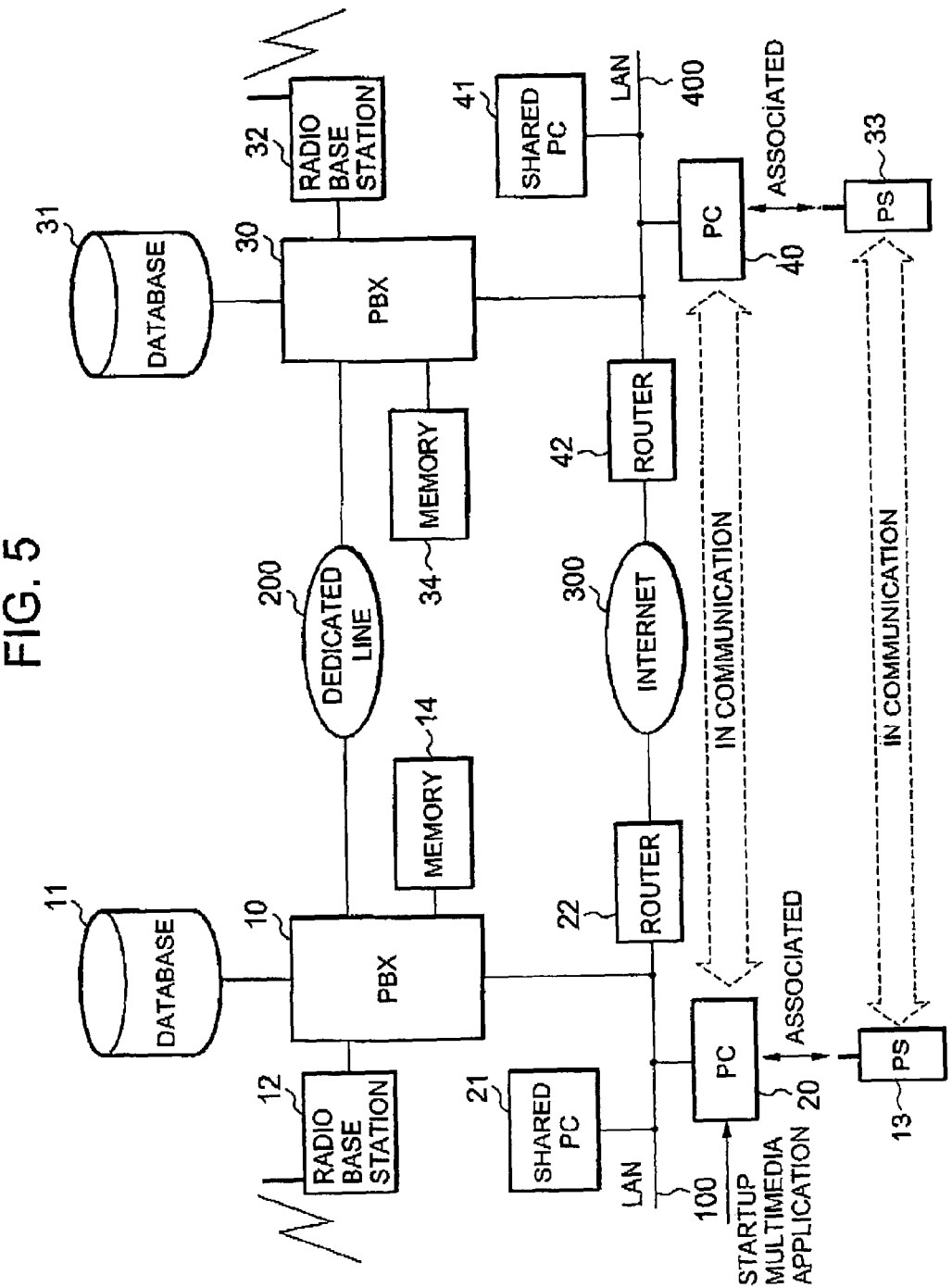
FIG. 5 is a block diagram showing an operation of the multimedia data transfer system when starting up multimedia application.

As shown in FIG. 5, during communication between the PSs 13 and 33, the personal computer 20 starts up a multimedia application and thereby the other personal computer 40 also starts up the multimedia application, allowing multimedia data to transfer between the personal computers 20 and 40. In this example, it is assumed that the personal computer 20 is associated with the personal PS 13 and has IP address "172.16.253.5" assigned thereto and the personal computer 40 is associated with the personal PS 33 and has IP address "10.41.89.35" assigned thereto.

When the personal computer 20 starts up the multimedia application with designating the PS 13 as an associated terminal during communication between the PSs 13 and 33, the PBX 10 registers association information including application status into the entry for the PS 12 (terminal number "3000") as shown in FIG. 2A. Similarly, the PBX 30 registers association information including application status into the entry for the PS 33 (terminal number "7000") as shown in FIG. 3A. When such association registrations between the personal computer 20 and the PS 13 and between the personal computer 40 and the PS 33 have been completed, the PBX 10 and the PBX 30 look at the association tables 11a and 31a respectively and, if predetermined conditions are satisfied as described later, then the multimedia applications running on the personal computers 20 and 40 start transferring multimedia data through the Internet 300.

1) Caller-Side PBX Operation

Figure 6:
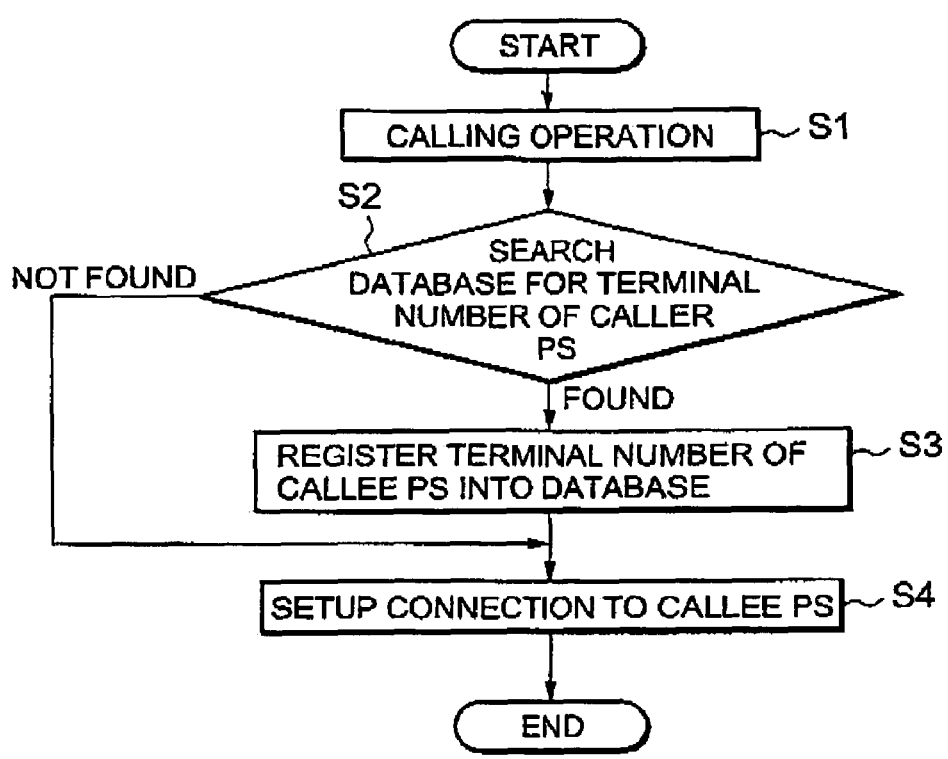
FIG. 6 is a flowchart showing an operation of a caller-side PBX in the multimedia data transfer system when calling in the first embodiment.

As shown in FIG. 6, when the PS 13 makes a call to the PS 33 through the dedicated line 200 by dialing the terminal number of the PS 33, the PBX 10 starts calling operation (step S1).

First, the PBX 10 searches the terminal number field of the association table 11a in the database 11 (see FIG. 2A) for the terminal number of the originating PS 13 (step S2).

When found, the destination terminal number of the PS 33 is registered into the other-end terminal number field of the association table 1a (step S3).

When not found or after the step S3, the PBX 10 sets up a connection to the callee PS 33, which is the well-known sequence (step S4).

2) Callee-Side PBX Operation

Figure 7:
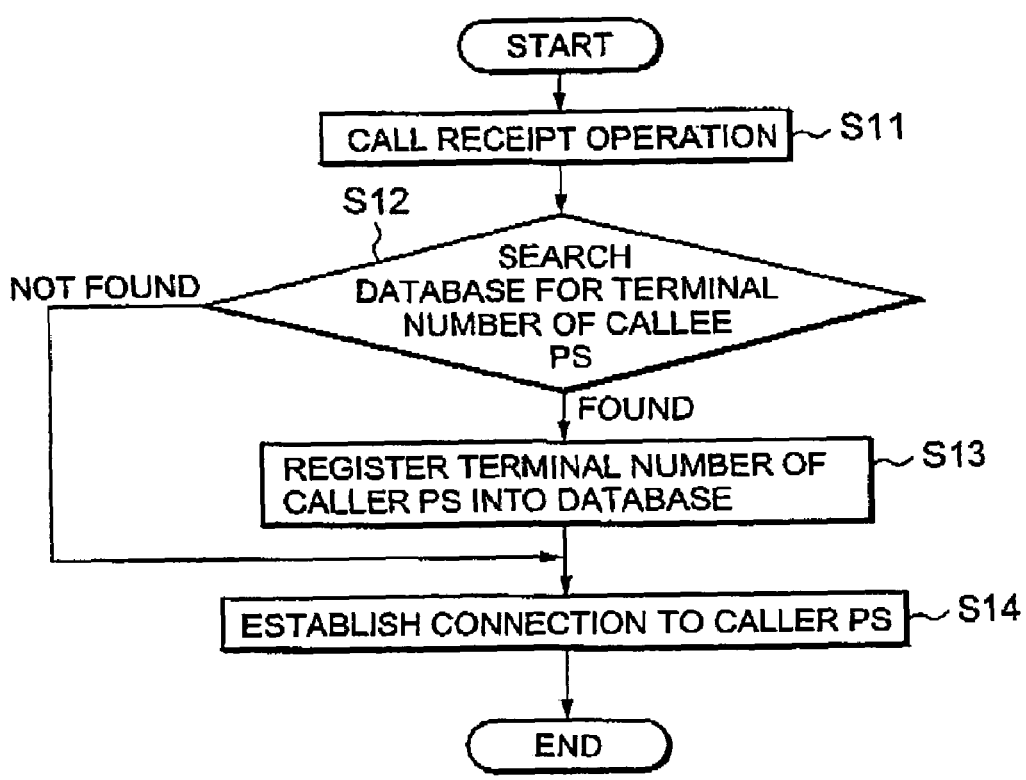
FIG. 7 is a flowchart showing an operation of a callee-side PBX in the multimedia data transfer system when calling in the embodiment.

As shown in FIG. 7, when having received the call from the PS 13 through the dedicated line 200, the PBX 30 starts call receipt operation (step S11).

First, the PBX 10 searches the terminal number field of the association table 31a in the database 31 (see FIG. 3A) for the terminal number of the callee PS 33 (step S2). When found, the terminal number of the caller PS 13 is registered into the other-end terminal number field of the association table 31a (step S13).

When not found or after the step S13, a connection between the caller PS 13 and the callee PS 33 is established, which is the well-known sequence (step S14).

3) Application Startup PBX Operation

It is assumed that a user of the personal computer 20 operates the personal computer 20 to enter the terminal number of the PS 13 (here, extension number "3000") to be associated with the personal computer 20 and starts up the multimedia application.

Figure 8:
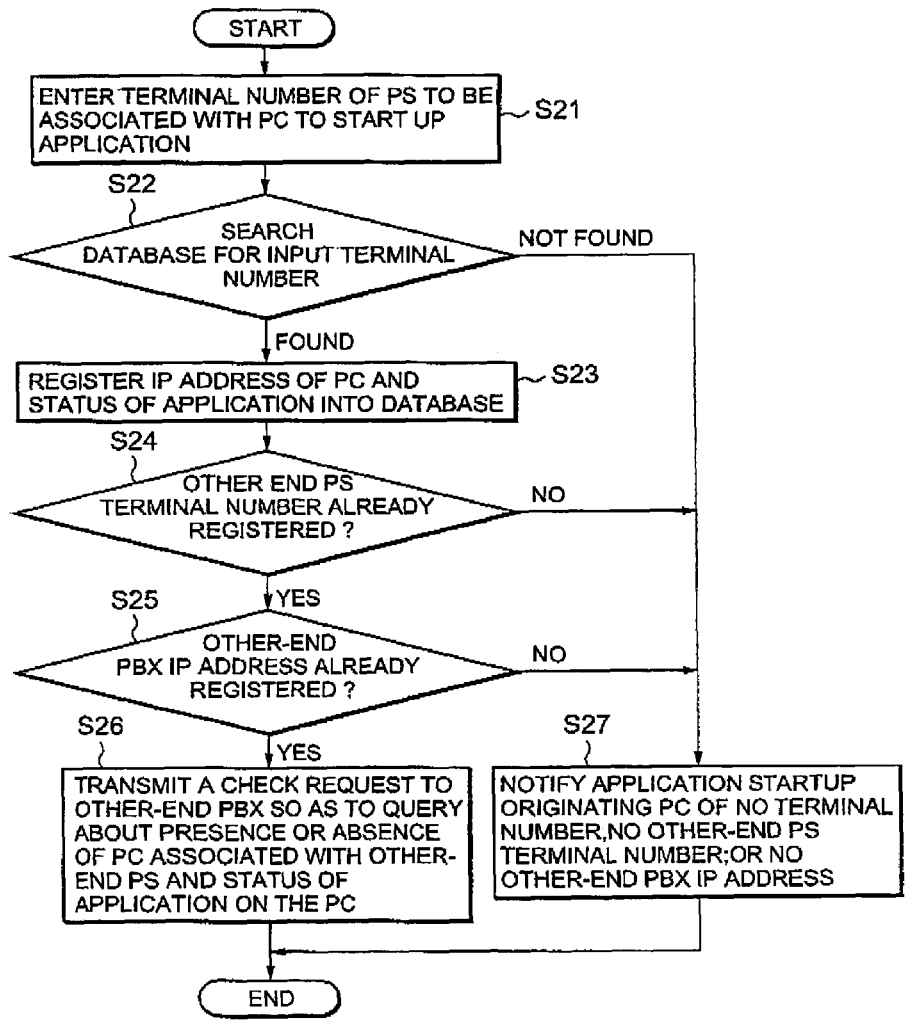
FIG. 8 is a flowchart showing an operation of an application startup PBX in the multimedia data transfer system in the embodiment.

As shown in FIG. 8, when having received application startup information from the personal computer 20 through the LAN 100, the EEX 10 starts the application startup operation (step S21).

First, the PBX 10 searches the terminal number field of the association table 11a in the database 11 for the user-input terminal number of the PS 13 (step S22). When not found, the PBX 10 notifies the personal computer 20 that the terminal number of the PS 13 is not registered in the database 11 (step S27).

When found, the IP address of the personal computer 20 and the application status (ready) of the multimedia application are registered into the associated PC IP address filed and the application status field of the association table 11a (step S23).

Next, the PBX 10 looks at the other-end terminal number field for the PS 13 in the association table 11a to determine the presence or absence of the party on the other end of the line (step S24). When not found (NO in step S24), the PBX 10 notifies the personal computer 20 that the other-end terminal number for the PS 13 is not registered in the database 1 (step S27).

When the other-end terminal number (here, "867000") is found (YES in step S24), the PBX 10 analyzes the other-end terminal number and searches the other-end PBX table 11b for the other-end PBX ID number (here, "86") to determine whether the IP address of the other-end PBX 30 is registered (step S25). When not registered (NO in step S25), the PBX 10 notifies the personal computer 20 that the IP address of the other-end PBX 30 is not registered in the other-end PBX table 11b (step S27).

When the IP address of the other-end PBX 30 has been registered in the other-end PBX table 11b (YES in step S25), the PBX 10 creates a check request message to query the other-end PBX 30 about the presence or absence of a personal computer 40 associated with the PS 33 and the application status of the multimedia application installed in the personal computer 40. Thereafter, the PBX 10 transmits to the PBX 30 the check request message through the Internet 300, the check request message including the terminal numbers of the PSs 13 and 33 (step S26).

4) Application status notifying PBX operation

Figure 9:
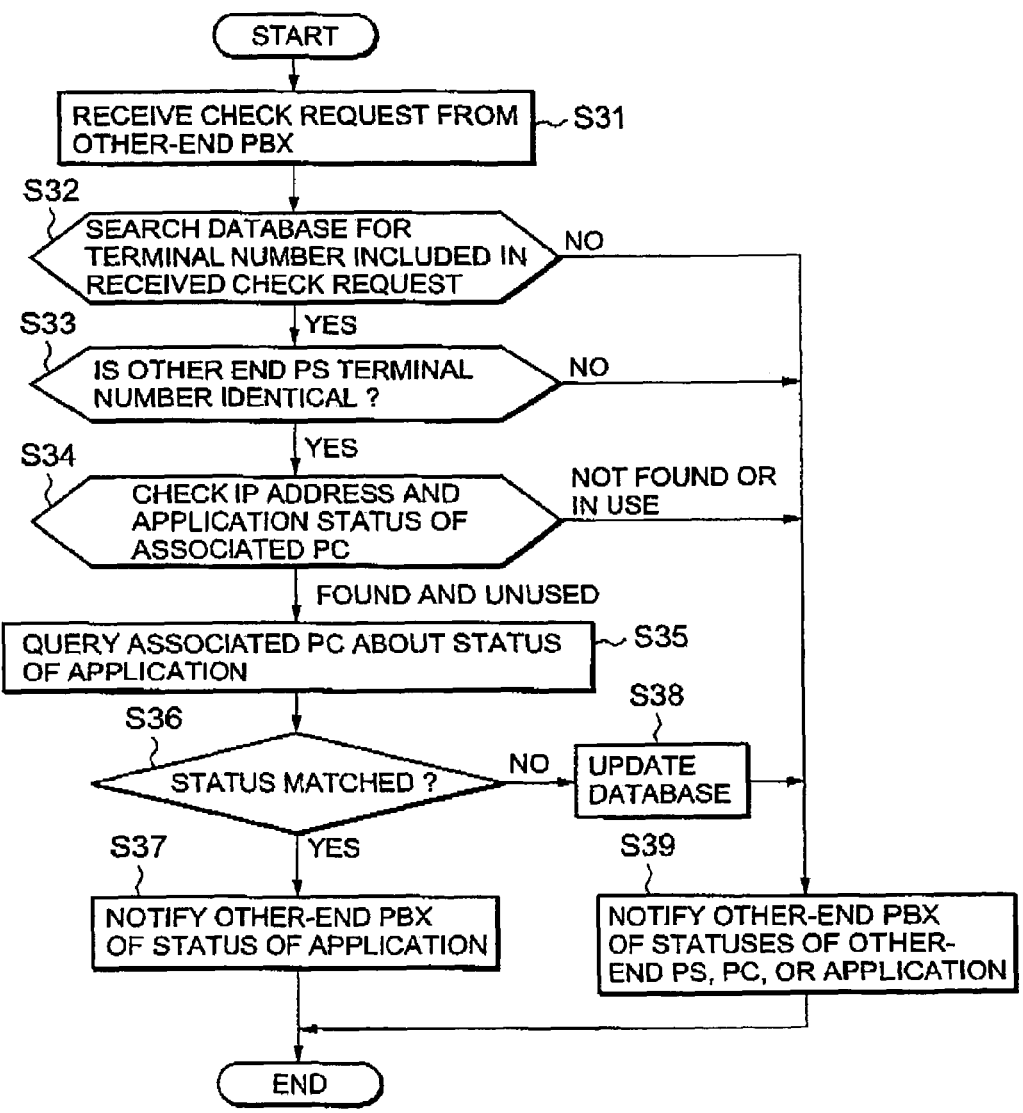
FIG. 9 is a flowchart showing an operation of the other PBX in the multimedia data transfer system when receiving a check request from the application startup PBX.

As shown in FIG. 9, when having received the check request message from the PBX 10, the PBX 30 starts the requested check operation (step S31).

First, the PBX 30 reads the terminal numbers of the PSs 13 and 33 from the received check request message and uses the terminal number of the PS 33 as a search key to search the terminal number field of the association table 31a (step S32). When the terminal number of the PS 33 is not found in the association table 31a (NO in step S32), the PBX 30 notifies the PBX 10 that the terminal number of the PS 33 are not registered in the database 31 (step S39).

When the terminal number of the PS 33 has been already registered in the association table 31a (YES in step S32), the PBX 30 further determines whether the other-end terminal number in the other-end terminal number field of the association table 31a for the terminal number of the PS 33 is identical to the terminal number of the PS 13 read out from the received check request message (step S33). When the other-end terminal number for the terminal number of the PS 33 is different from the terminal number of the PS 13 (NO in step S33), the PBX 30 notifies the PBX 10 that the terminal number of the PS 13 are not registered in the database 31 (step S39).

When the other-end terminal number for the terminal number of the PS 33 is identical to the terminal number of the PS 13 (YES in step S33), the PBX 30 checks the associated-PC IP address field and the application status field for the terminal number of the PS 33 (step S34). When the multimedia application is unregistered (not found) or is in use, the PBX 30 notifies the PBX 10 of the status of the multimedia application together with the terminal number of the PS 13 (step S39). In the case of such unregistered status, the startup operation of the multimedia application on the personal computer 40 will start as described later.

When the multimedia application is registered (found) and unused, the PBX 30 queries the associated personal computer 40 about the status of the multimedia application installed in the associated personal computer 40 (step S35). Depending on a response to the query (including no response) received from the associated personal computer 40, the PBX 30 determines whether the application status stored in the application status field for the terminal number of the PS 33 matches the currently checked application status (step S36). If not identical or no response (NO in step S36), then the PBX 30 updates the associated-PC IP address field and the application status field for the terminal number of the PS 33 (step S38) and thereafter the PBX 30 notifies the PBX 10 of the current status of the multimedia application together with the terminal number of the PS 13 as a response to the check request (step S39).

When the application status stored in the application status field for the terminal number of the PS 33 matches the currently checked application status (YES in step S36), the PBX 30 transmits to the PBX 10 an application status response indicating that the multimedia application runs on the associated personal computer 40 but unused (step S37).

5) Multimedia Data Transfer Operation

As shown in FIG. 10A, when having received the application status response from the PBX 30 step S41), the PBX 10 searches the terminal number field of the association table 11a for the terminal number of the PS 13 to determine the IP address of the associated personal computer 20. Subsequently, the PBX 10 sends the application status response to the associated personal computer 20 (step S42).

As shown in FIG. 10B, when having received the application status response from the PBX 10 (step S51), the personal computer 20 analyzes the application status response to determine whether the application status on the other-end personal computer 40 indicates the presence of the multimedia application and the unused status (step S52).

When the application status on the other-end personal computer 40 is OK, the personal computer 20 starts establishing a connection to the other-end personal computer 40 to communicate between the multimedia applications through the Internet 300 (step S53).

6) Application Startup Other-End PBX Operation

In the case where the PBX 10 has been received from the PBX 30 an application status response indicating that the multimedia application on the other-end personal computer 40 is not registered or start up, the user of the PS 13 uses the active telephone line between the PSs 13 and 33 through the dedicated line 200 to verbally instruct the other-end user of the PS 33 to start up the multimedia application on the personal computer 40. The user of the PS 33 enters the terminal number of the PS 33 to be associated with the personal computer 40 and starts up the multimedia application. This operation will be described with reference to FIGS. 8–11.

This application startup information is sent from the personal computer 40 to the PBX 30 through the LAN 400, and thereby the PBX 30 starts the application startup operation (see step S21 in FIG. 8).

First, the PBX 30 searches the terminal number field of the association table 31a in the database ll for the user-input terminal number of the PS 33 (see step S22 in FIG. 8). When not found, the PBX 30 notifies the personal computer 40 that the terminal number of the PS 33 is not registered in the database 11 (see step S27 in FIG. 8).

When found, the IP address of the personal computer 40 and the application status (ready) of the multimedia application are registered into the associated PC IP address filed and the application status field of the association table 31a (see step S23 in FIG. 8).

Next, the PBX 30 looks at the other-end terminal number field for the PS 33 in the association table 31a to determine the presence or absence of the party on the other end of the line (see step S24 in FIG. 8). When not found (NO in step S24), the PBX 30 notifies the personal computer 40 that the other-end terminal number for the PS 33 is not registered in the database 31 (see step S27 in FIG. 8).

When the other-end terminal number is found (YES in step S24), the PBX 30 analyzes the other-end terminal number and searches the other-end PBX table 31b for the other-end PBX ID number to determine whether the IP address of the other-end PBX 10 is registered (see step S25 in FIG. 8). When not registered (NO in step S25), the PBX 30 notifies the personal computer 40 that the IP address of the other-end PBX 10 is not registered in the other-end PBX table 31b (see step S27 in FIG. 8).

When the IP address of the other-end PBX 710 has been registered in the other-end PBX table 31b (YES in step S25), the PBX 30 creates a check request message to query the other-end PBX 10 about the presence or absence of the personal computer 20 associated with the PS 13 and the application status of the multimedia application installed in the personal computer 20. Thereafter, the PBX 30 transmits to the PBX 10 the check request message through the Internet 300, the check request message including the terminal numbers of the PSs 13 and 33 (see step S26 in FIG. 8).

When having received the check request message from the PBX 30, the PBX 10 starts the requested check operation (see step S31 in FIG. 9).

First, the PBX 10 reads the terminal numbers of the PSs 13 and 33 from the received check request message and uses the terminal number of the PS 13 as a search key to search the terminal number field of the association table 11a (see step S32 in FIG. 9). When the terminal number of the PS 13 is not found in the association table 11a (NO in step S32), the PBX 10 notifies the PBX 30 that the terminal number of the PS 13 are not registered in the database 11 (see step S39 in FIG. 9)

When the terminal number of the PS 13 has been already registered in the association table 11a (YES in step S32), the PBX 10 further determines whether the other-end terminal number in the other-end terminal number field of the association table 11a for the terminal number of the PS 13 is identical to the terminal number of the PS 33 read out from the received check request message (see step S33 in FIG. 9). When the other-end terminal number for the terminal number of the PS 13 is different from the terminal number of the PS 33 (NO in step S33), the PBX 10 notifies the PBX 30 that the terminal number of the PS 33 are not registered in the database 11 (see step S39 in FIG. 9)

When the other-end terminal number for the terminal number of the PS 13 is identical to the terminal number of the PS 33 (YES in step S33), the PBX 10 checks the associated-PC IP address field and the application status field for the terminal number of the PS 13 (see step S34 in FIG. 9). When the multimedia application is unregistered (not found) or is in use, the PBX 10 notifies the PBX 30 of the status of the multimedia application together with the terminal number of the PS 33 (see step S39 in FIG. 9). In the case of such unregistered status, the startup operation of the multimedia application on the personal computer 20 will start as described later.

When the multimedia application is registered (found) and unused, the PBX 10 queries the associated personal computer 20 about the status of the multimedia application installed in the associated personal computer 20 (see step S35 in FIG. 9). Depending on a response to the query (including no response) received from the associated personal computer 20, the PBX 10 determines whether the application status stored in the application status field for the terminal number of the PS 13 matches the currently checked application status (see step S36 in FIG. S9). If not identical or no response (NO in step S36), then the PBX 10 updates the associated-PC IP address field and the application status field for the terminal number of the PS 13 (see step S38'in FIG. 9) and thereafter the PBX 10 notifies the PBX 30 of the current status of the multimedia application together with the terminal number of the PS 33 as a response to the check request (see step S39 in FIG. 9).

When the application status stored in the application status field for the terminal number of the PS 13 matches the currently checked application status (YES in step S36), the PBX 10 transmits to the PBX 30 an application status response indicating that the multimedia application runs on the associated personal computer 20 but unused (see step S37 in FIG. 9).

When having received the application status response from the PBX 10 (see step S41 in FIG. 10A), the PBX 30 searches the terminal number field of the association table 31a for the terminal number of the PS 33 to determine the IP address of the associated personal computer 40. Subsequently, the PBX 30 sends the application status response to the associated personal computer 40 (see step S42 in FIG. 10A).

When having received the application status response from the PBX 30 (see step S51 in FIG. 10B), the personal computer 40 analyzes the application status response to determine whether the application status on the other-end personal computer 20 indicates the presence of the multimedia application and the unused status (see step S52 in FIG. 10B).

When the application status on the other-end personal computer 20 is OK, the personal computer 40 starts establishing a connection to the other-end personal computer 20 to communicate between the multimedia applications through the Internet 300 (see step S53 in FIG. 10B).

As described above, during communication between personal mobile stations 13 and 33 through the dedicated line 200 connecting the PBXs 10 and 30, the multimedia applications installed in respective personal computers 20 and 40 each associated to the personal mobile stations 13 and 33 are automatically allowed to communicate with each other, resulting in improved efficiency of starting multimedia data transmission.

Further, the respective personal computers 20 and 40 are provided with multimedia applications, which can transmit and receive control signals to and from PBXs 10 and 30, respectively. Such a relatively simple configuration-makes various kinds of multimedia applications usable, such as video conference, white board, or chat, resulting in improved workability.

In addition, association of a personal computer with a personal mobile station is made only by operating any nearby personal computer connected to the LAN as described above. Accordingly, data communication between personal computers each associated with personal mobile stations can be realized without the users moving to a specific personal computer. Further, a combination of personal computers 20 and 40 for data communication can be changed to a different combination, such as a combination of shared personal computers 21 and 41.

The personal mobile stations 13 and 33 are not restricted to on-premises PHS phones. Another type of mobile telephone may be used as personal mobile station. Similarly, the LAN 100 or 400 may be replaced with wireless LAN and the personal computer 20 or 40 may be replaced with PDA (personal digital assistant) terminal of the wireless LAN.

In the above embodiment, data communication is performed between different LANs through the Internet. However, the present invention is not restricted to this embodiment. The multimedia applications on personal computers belonging to the same LAN can communicate with each other as described above.

What is claimed is:

1. A system for transferring multimedia data between processes generated by software programs each running on information processing terminals, wherein the information processing terminals are capable to communicate with each other through at least one call connection controller that accommodates a plurality of extension terminals, wherein each call connection controller comprises:
   a database for storing association information when an association operation has been performed between an extension terminal and an information processing terminal, which are both connected to the call connection controller;
   a determining section for determining the presence or absence of an information processing terminal that has completed the association operation and a status of a software program on the information processing terminal; and
   a communications controller controlling such that, during communication between a first extension terminal and a second extension terminal, when first and second information processing terminals that have completed the association operations with the first and second extension terminals have been found and both of software programs on the first and second information processing terminals are ready and currently unused, multimedia data starts transferring between processes generated by the software programs running on the first and second information processing terminals, respectively.

2. The system according to claim 1, wherein a process generated by a software program running on each information processing terminal allows a control signal to exchange with a call connection controller connected to the information processing terminal.

3. The system according to claim 2, wherein the information processing terminal is connected to the call connection controller by one of wired LAN (Local Area Network) and wireless LAN.

4. The system according to claim 1, wherein address information of an information processing terminal and a status of a software program on the information processing terminal are stored in the database when the software program starts up.

5. The system according to claim 1, wherein when one of a call originating operation and a call receiving operation is performed at an extension terminal, a terminal number of an other-end extension terminal is stored in the database.

6. A method for transferring multimedia data between processes generated by software programs each running on information processing terminals, wherein the information processing terminals are capable to communicate with each other through at least one call connection controller that accommodates a plurality of extension terminals, the method comprising:
   a) storing association information in a database when an association operation has been performed between an extension terminal and an information processing terminal;
   b) during communication between a first extension terminal and a second extension terminal, searching the database to determine the presence or absence of first and second information processing terminals that have completed the association operations with the first and second extension terminals and statuses of software programs on the first and second information processing terminals; and
   c) when the first and second information processing terminals have been found and both of the software programs are ready and currently unused, starting transfer of multimedia data between processes generated by the software programs running on the first and second information processing terminals, respectively.

7. The method according to claim 6, wherein the steps b) and c) comprise:
   when starting up a first software program on a first information processing terminal during communication between a first extension terminal associated with the first information processing terminal and a second extension terminal, searching the database to determine the presence or absence of a second information processing terminal that has completed the association operation with the second extension terminals and a status of a second software program on the second information processing terminal; and when the second information processing terminal has been found and the second software program is currently unused, starting transfer of multimedia data between processes generated by the first and second software programs running on the first and second information processing terminals.

8. A call connection controller accommodating a plurality of extension terminals in a system for transferring multimedia data between processes generated by software programs each running on information processing terminals, comprising:

a database for storing association information when an association operation has been performed between an extension terminal and an information processing terminal, which are both connected to the call connection controller;

a determining section for determining the presence or absence of an information processing terminal that has completed the association operation and a status of a software program on the information processing terminal; and a communications controller controlling such that, during communication between a first extension terminal and a second extension terminal, when first and second information processing terminals that have completed the association operations with the first and second extension terminals have been found and both of software programs on the first and second information processing terminals are ready and currently unused, multimedia data starts transferring between processes generated by the software programs running on the first and second information processing terminals, respectively.

9. A method for associating an extension terminal with a process generated by a software program running on an information processing terminal to transfer multimedia data between processes generated by software programs each running on information processing terminals, the method comprising:

when one of a call originating operation and a call receiving operation is performed at an extension terminal, storing an other-end terminal number of an other-end extension terminal in a database;

when starting up a first software program on a first information processing terminal by designating a terminal number of the extension terminal during communication with the other-end extension terminal, registering address information of the first information processing terminal and a status of the first software program for the terminal number in the database;

querying about the presence or absence of a second information processing terminal associated with the other-end extension terminal and a status of a second software program on the second information processing terminal; and when receiving a response that the second information processing terminal has been found and the second software program is ready and currently unused, starting transfer of multimedia data between processes generated by the first and second software programs running on the first and second information processing terminals.

10. A computer-readable program for instructing a computer to transfer multimedia data between processes generated by software programs each running on information processing terminals, wherein the information processing terminals are capable to communicate with each other through at least one call connection controller that accommodates a plurality of extension terminals, the computer-readable program comprising the steps of:

storing association information in a database when an association operation has been performed between an extension terminal and an information processing terminal;

during communication between a first extension terminal and a second extension terminal, searching the database to determine the presence or absence of first and second information processing terminals that have completed the association operations with the first and second extension terminals and statuses of software programs on the first and second information processing terminals; and when the first and second information processing terminals have been found and both of the software programs are ready and currently unused, starting transfer of multimedia data between processes generated by the software programs running on the first and second information processing terminals, respectively.

* * * * *